(12) United States Patent
Leidich et al.

(10) Patent No.: US 11,851,155 B1
(45) Date of Patent: Dec. 26, 2023

(54) SMALL ZERO PRESSURE BALLOON SYSTEMS

(71) Applicant: URBAN SKY, Denver, CO (US)

(72) Inventors: Jared Leidich, Denver, CO (US); Maxmillion J. W. McLaughlin, Fort Myers, FL (US); Nolan G. Smith, Denver, CO (US); Mitchell W. Sweeney, Alvin, TX (US)

(73) Assignee: URBAN SKY THEORY INC., Denver, CO (US)

( * ) Notice: Subject to any disclaimer, the term of this patent is extended or adjusted under 35 U.S.C. 154(b) by 0 days.

(21) Appl. No.: 18/204,848

(22) Filed: Jun. 1, 2023

Related U.S. Application Data (60) Provisional application No. 63/366,209, filed on Jun. 10, 2022.

(51) Int. Cl.
*B64B 1/40* (2006.01)
*B64B 1/62* (2006.01)

(52) U.S. Cl.
CPC . *B64B 1/62* (2013.01); *B64B 1/40* (2013.01)

(58) Field of Classification Search
CPC .................................. B64B 1/62; B64B 1/40
See application file for complete search history.

(56) References Cited

U.S. PATENT DOCUMENTS

| | | | | |
|---|---|---|---|---|
| 3,094,807 A | * | 6/1963 | Dorman | A63H 27/10 446/222 |
| 4,944,242 A | * | 7/1990 | Russell | B64B 1/50 116/210 |
| 2023/0234693 A1 | * | 7/2023 | Persechino | B64B 1/32 244/123.11 |

* cited by examiner

*Primary Examiner* — Tye William Abell
(74) *Attorney, Agent, or Firm* — HOLZER PATEL DRENNAN (57) ABSTRACT

Small volume, zero pressure balloon systems for remote sensing activities in the upper atmosphere. A balloon system includes an air ingestion clip proximate the nadir fitting to inhibit air ingestion during ascent, the clip releasing to allow air expulsion at a predetermined altitude. Another balloon system includes a parachute system having inflation guards that inhibit the parachute from inflating when inverted during ascent and float, the guards releasing to allow parachute inflation during descent.

18 Claims, 11 Drawing Sheets

SMALL ZERO PRESSURE BALLOON SYSTEMS

CROSS-REFERENCE

This application claims priority to U.S. provisional application Ser. No. 63/366,209 filed Jun. 10, 2022 and titled REUSABLE LIGHTER THAN AIR BALLOON WITH INGESTION GUARD AND INVERTED, DESCENT-READY PARACHUTE, the entire disclosure of which is incorporated herein by reference for all purposes.

BACKGROUND

High altitude balloons are useful platforms for applications like atmospheric sampling, celestial imaging, and communications repeating. Due to the high vantage point of the stratosphere, high altitude balloons are also becoming useful platforms for earth observation and remote sensing applications.

The miniaturization of avionics and optical equipment in recent years has allowed payload systems used with balloon systems to get smaller and lighter. In some cases, balloon systems could be so small that they could be launched from a mobile platform, which may allow for specific targeting of a balloon through launch site selection and weather modeling. For example, an operator could launch a balloon from a location that is upwind of a desired target, allowing the balloon to drift over the target passively. In addition to being small enough to be feasibly launched from a mobile platform, the capability to achieve a "float" state (e.g., a state where it is neither substantially ascending nor descending in the sky after ascending) is also an important feature for applications that rely on data collected by a balloon system payload. If a balloon were not able to float at a near stable altitude, targeting would be very difficult, and the resolution of remote sensing data would be constantly changing as the balloon's altitude changed.

SUMMARY

The present disclosure provides balloon systems for remote sensing activities in the upper atmosphere. The balloon systems are capable of substantially stable altitude flight while being relatively small and very light. The balloon systems can be referred to as "zero pressure."

A balloon system described herein includes a mechanism to inhibit air ingestion during ascent, which releases to allow lift gas expulsion at a predetermined altitude.

Another balloon system described herein includes a parachute system having inflation guards that inhibit the parachute from inflating when inverted during ascent.

In one particular implementation, this disclosure provides a balloon system with a balloon envelope having an interior, a first end and a second end having a nadir fitting. The balloon system also has an ingestion clip positioned on an exterior of the balloon envelope between the first end and the second end and sealing access to the interior, the ingestion clip having at least one element secured against the exterior of the balloon envelope with a fastener with a set breaking strength.

In another particular implementation, this disclosure provides a small volume, zero pressure balloon system with a small volume balloon envelope having an interior, a first end and a second end having a nadir fitting, with an ingestion clip configured to release lift gas from the balloon envelope through the nadir fitting dependent on a set pressure within the balloon envelope.

In yet another particular implementation, this disclosure provides a method of using a zero pressure balloon system, the balloon system having a balloon envelope and an ingestion clip removably connected thereto, with sufficient lift gas in the balloon envelope to initiate ascent of the balloon system to a float elevation. During ascent of the balloon, the ingestion clip is engaged on the balloon envelope to hold the balloon envelope closed and inhibit air ingestion into the balloon envelope, and during float of the balloon, the ingestion clip is already disengaged from the balloon envelope to allow lift gas to vent from the balloon envelope. The ingestion clip does not reengage the balloon envelope during float or descent.

These and other aspects of the balloon systems described herein will be apparent after consideration of the Detailed Description and figures herein. It is to be understood, however, that the scope of the claimed subject matter shall be determined by the claims as issued and not by whether given subject matter addresses any or all issues noted in the Background or includes any features or aspects recited in the Summary.

DETAILED DESCRIPTION

As indicated above, the present disclosure is directed to balloon systems, particularly small and very small balloons, for remote sensing activities in the upper atmosphere.

High altitude, lighter than air, balloons can be filled with a lift gas that is less dense than air, such as helium or hydrogen. When filled with the appropriate amount of lift gas, a balloon can ascend into the sky and be used to perform a useful task. As a balloon ascends, the gas within the balloon expands unless it is constrained.

Many weather-related balloons are made from a stretchy material, such as latex, that can stretch to allow the balloon to enlarge as the gas expands. This type of balloon expands until it eventually pops, leaving the payload to descend. Other balloon types are made from materials, like polyethylene, that do not stretch substantially during ascent. These balloons have an envelope that is not entirely full at launch, so that the gas has space to expand into as the balloon ascends. This type of balloon may have ducts at the base of the balloon that let gas out of the balloon when it becomes full. Such a balloon only vents gas while the gas is expanding; this venting process creates a mechanism by which a balloon can passively achieve a float state, where it is neither substantially ascending nor descending.

Historically, ducted balloons that are made of a material that does not substantially stretch are referred to as "zero pressure" balloons and are very large. Described herein are atypical, small zero pressure balloons and balloon systems, having a fully inflated maximum volume that may be between 10 and 1,000 cubic meters. Other lighter than air balloons may range in size from 10,000 to 1,000,000 cubic meters.

Small zero pressure balloons can be used, for example, to capture remote sensing data. A balloon used to capture remote sensing data could achieve accurate placement through weather modeling and launch site selection, for those balloons that are small enough to be launched from a mobile platform. Small zero pressure balloons behave differently than large zero pressure balloons. First, a small balloon with a small and lightweight payload beneath it has a different gauge pressure at the top of the balloon when compared to the gauge pressure at the top of a larger, heavier balloon at the same altitude. That difference in pressure at the top of the balloon, called "apex pressure," allows use of different mechanisms in order for the balloon to work correctly. Second, a large balloon has more inertial stability than a small balloon; a large balloon swings around less during an ascent than a small balloon.

Large zero pressure balloons often include a large one-way valve at the base that allows gas to flow in one direction but not the other. These are sometimes referred to as "reed valve" type structures and may be constructed from bonded flat sheets of thin film that open under a positive pressure allowing gas to escape. When not under a positive pressure, this valve is typically closed so air cannot come into the balloon envelope. A reed valve is similar to common "duck bill" valves that also allow flow in only one direction. These types of valves can also stop air from entering the bottom of a balloon. Reed valves require a positive pressure to actuate, which may affect small balloons differently than large balloons.

A balloon having a vent duct in conjunction with a reed valve may necessitate considerable positive pressure during venting, as the valve requires internal pressure for activation. Balloons may continue ascending until no excess lifting gas remains, even with venting occurring until the balloon reaches and maintains a floating state where it no longer ascends.

For substantially large, non-elastic balloons exhibiting a natural shape, the positive pressure needed for venting the lifting gas may not significantly hinder the attainment of a stable floating state. However, smaller balloons made of elastic materials or having irregular shapes may encounter issues stemming from the internal pressure generated during venting via a reed valve.

In certain instances, positive pressure within the balloon may cause stretching or expansion of the balloon envelope, resulting in a greater volume than in its relaxed state, thereby potentially allowing the balloon to rise higher than intended due to its unnaturally increased volume. If a balloon ascends excessively, the lifting gas may continue expanding and over-vent. Consequently, when the balloon reverts to its natural shape and volume after the positive pressure subsides, its mass may exceed the buoyant force generated by the lifting gas, causing the balloon to descend rather than maintain a constant altitude. This effect may have a more pronounced impact on smaller balloons compared to larger ones, as the total gas volume in a smaller balloon is less than that in a larger balloon, exacerbating the consequences of over-vented gas for smaller balloons.

In certain buoyant balloons, a passive venting mechanism is utilized, which has a basic opening at the balloon's base to release lifting gas as the balloon nears its floating altitude. This technique offers the benefits of simplicity and the ability to vent with minimal positive pressure, mitigating issues linked with positive pressure induced by reed-valve systems or other mechanisms that need significant positive pressure for operation. Nevertheless, such open-bottom balloons may encounter challenges related to air intake during the early stages of a balloon flight, potentially detrimentally affecting the overall performance. When a balloon possesses a completely open base and is only partially filled, there is no barrier to prevent air from entering through the bottom. As the lift gas naturally expands the balloon material, negative pressure may form at the balloon base, potentially drawing air into the bottom and occupying some of the available gas space with air. If this air significantly mixes with the lifting gas, the balloon might reach its full capacity earlier than anticipated due to the presence of air in the envelope. Consequently, a lower-density lifting gas, partially composed of air, may cause the balloon to float at a lower altitude than desired and potentially result in the balloon's inability to maintain a stable floating altitude.

Whether with a reed valve, vent duct, or an open-bottom balloon, when a large zero pressure balloon is done performing its useful activities at the end of a mission, a termination system initiates balloon descent. A typical termination system for a large balloon utilizes a cord called a "gore line" that effectively tears the envelope so that the gas can escape. This typical architecture with a gore line may destroy the envelope so that it cannot be reused, and also typically creates two separate descending objects, the balloon carcass and the payload, which would no longer be attached to one another. The payload typically descends via a parachute, however the balloon carcass typically descends without a parachute. Many remote sensing applications are centered around human activity, and thus require balloons to operate around people and dense population centers. Such a large zero pressure balloon system may not be ideal for balloons that terminate near population centers for three reasons. First, such a system has multiple pieces of falling debris instead of one. Second, such a system leaves one object, the balloon carcass, to fall uncontrolled without a parachute. Third, the system allows two massive objects, the balloon carcass and the payload, to descend near populations. Because of the hazards a large zero pressure balloon may pose, there is a desire in remote sensing applications to add extra safeguards against a balloon carcass, payload, or balloon/payload system from falling at high velocity into a populated area.

The balloon systems described herein improve upon the above-described shortcomings of existing balloon systems.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

Figure 1:
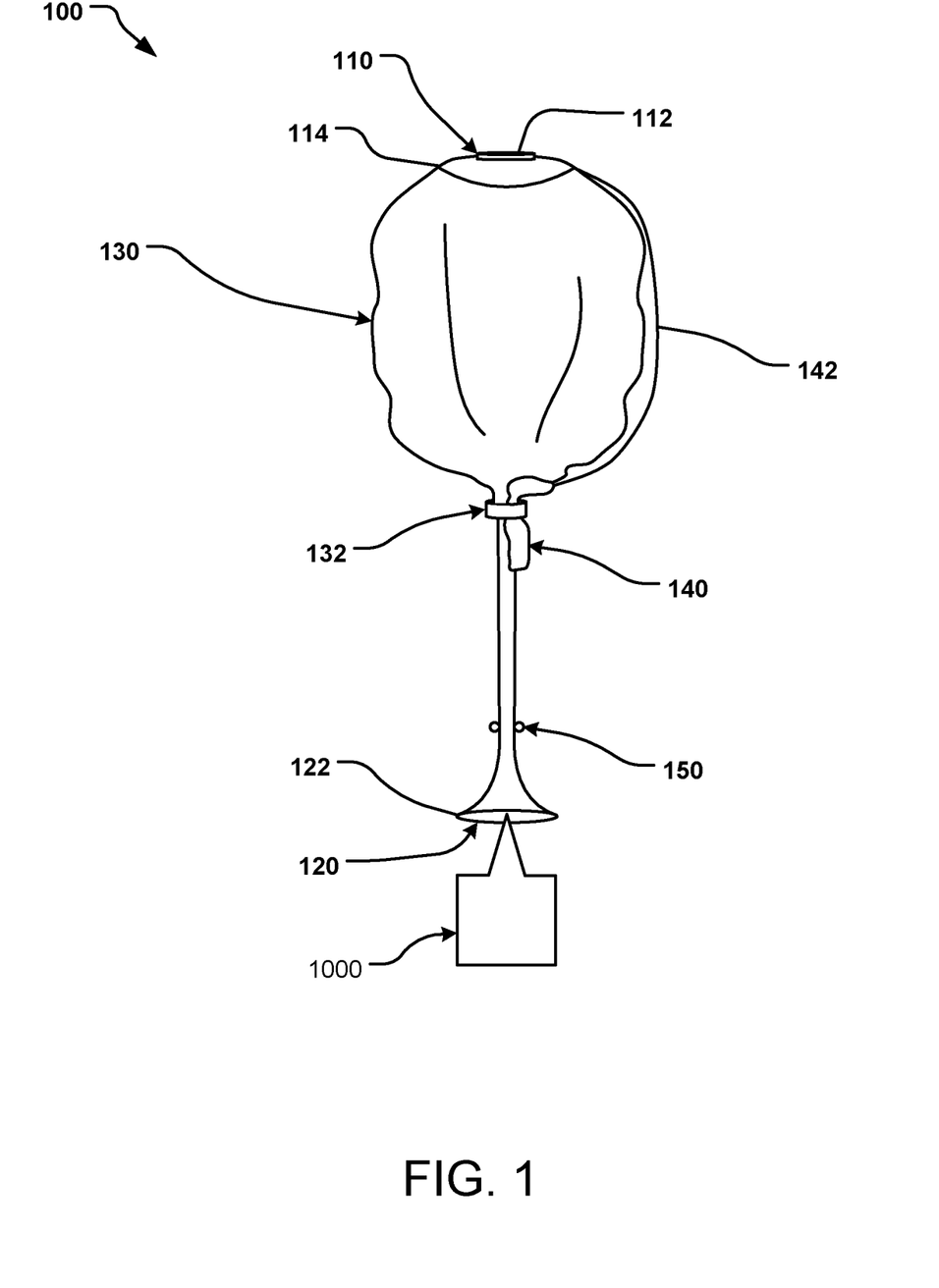
FIG. 1 is a schematic view of an example balloon system in a first configuration.

Turning to the figures, FIG. 1 shows a balloon system 100 having a balloon envelope or bubble 130 and a payload 1000 attached thereto. The payload 1000 could be used for useful balloon-based tasks like remote sensing with an imaging system. The balloon envelope 130 has an interior (not visible) configured to be filled with a lift gas such as helium or hydrogen. The balloon system 100 is a zero pressure balloon system, as will be explained below.

The balloon envelope 130 has a first end 110 and an opposite second end 120, which in this design, has an opening providing access to the interior of the balloon envelope 130. The first end 110 of the balloon envelope 130 is sealed with an apex fitting 112. At the second end 120 is a nadir fitting 122. The nadir fitting 122 is a rigid element having a substantially or fully unobstructed aperture therein, creating a substantially unobstructed path from the interior of the balloon envelope 130 to the outside; the nadir fitting 122 may be circular, oval, or other shape. The payload 1000 is attached to the balloon envelope 130 at the nadir fitting 122. Additional details regarding a nadir fitting are provided below in respect to FIGS. 6A and 6B and FIG. 7.

In FIG. 1, the balloon system 100 is in a launch configuration, with the balloon envelope 130 not fully expanded.

The balloon envelope 130 is shown constrained by a launch collar 132, positioned here approximately centered between the first end 110 and the second end 120. This launch collar 132 could be used to keep the lift gas contained and to physically restrain the envelope 130, e.g., so it cannot flap and take on the form of a parachute or spinnaker sail at launch.

Tethered to the first end 110 is a parachute 140, connected via a structural cord or set of cords 142 that connect the parachute 140 structurally to one or more tabs 114 near the first end 110. The launch collar 132 could also optionally be used to secure the parachute 140 and/or cords 142 so that the parachute cannot blow around during the launch process.

Affixed to the exterior surface of the envelope 130 proximate the second end 120, near the nadir fitting 122, is an ingestion clip 150, which inhibits flow of air into and gas out from the balloon envelope 130. In some embodiments, the ingestion clip 150 provides a fluid-tight seal. Additional details regarding the ingestion clip 150 are provided below in reference to FIGS. 3 and 4.

Figure 2:
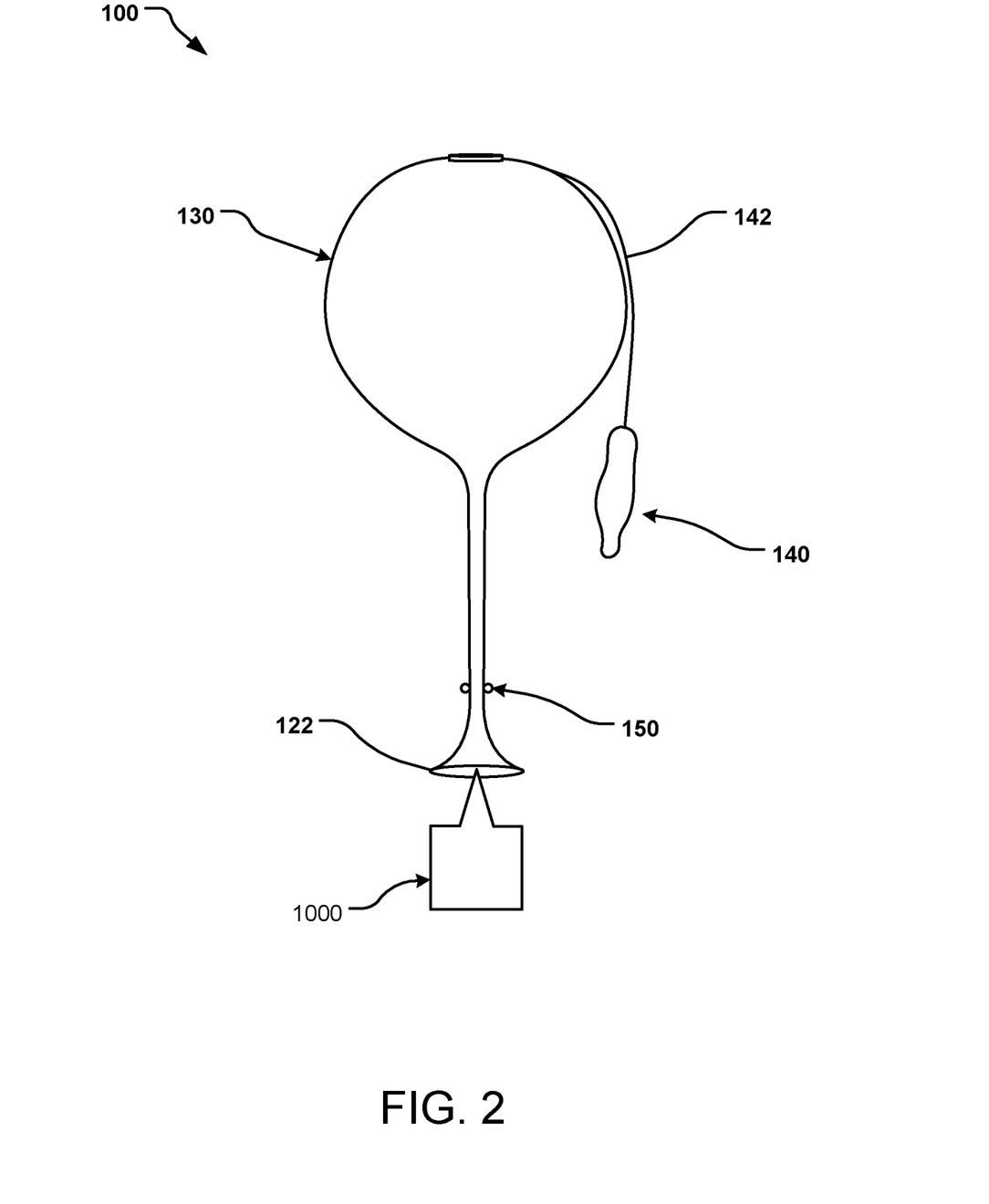
FIG. 2 is a schematic view of the balloon system of FIG. 1 in a second configuration.

FIG. 2 shows the balloon system 100 during the early phase of an ascent, at a higher elevation than in FIG. 1. At the higher elevation, the gas within the balloon envelope 130 has increased in volume (e.g., due to the reduced atmospheric pressure); at this phase, the launch collar may no longer be present, allowing the parachute 140 to hang freely from the side of the balloon envelope 130 as it ascends. If the balloon system 100 were to somehow fail to maintain lift during the ascent and start to descend, the parachute 140 is already out and could be available to slow the descent of the system 100 at any time.

Prior to launch (FIG. 1) and during the early parts of ascent (FIG. 2), the ingestion clip 150 can create a substantially air-tight seal so that air does not get into the balloon envelope 130. As pressure within the envelope 130 increases as the balloon system 100 rises, increasing the volume of the envelope 130, the ingestion clip 150 is forced open by the pressure and the clip 150 releases from the envelope 130.

When the ingestion clip 150 pops off the base of the balloon envelope 130, an aperture or vent opens, which may be part of the nadir fitting 122, allowing substantially unobstructed venting of lift gas, e.g., through the fitting 122.

Zero pressure balloon systems, such as the balloon system 100, achieve substantially stable float altitudes by passively venting lift gas out the bottom of the balloon when the balloon envelope 130 becomes full during ascent. Sufficient gas vents from the envelope 130 to dissuade additional ascent, while sufficient gas therein maintains the desired altitude. In such a manner, the interior pressure within the envelope at the base of the balloon is even with, or "zero", compared to the atmospheric pressure at that altitude.

In the present design, the ingestion clip 150 inhibits air ingestion into the envelope 130 during launch and ascent because the balloon envelope 130 is sealed by the ingestion clip 150; undesired air ingestion can be problematic. When the pressure inside the balloon envelope 130 has sufficiently increased and the envelope 130 is at its desired fullness and mildly pressurized, near the point at which the gas should start venting, the ingestion clip 150 opens and pops off of the balloon envelope 130, opening access to the interior of the envelope 130.

When the balloon envelope 130 is venting, air ingestion is not a concern because lift gas may actively be moving out of the open duct at the nadir fitting 122, which would inhibit any air from entering. When sufficient gas has vented from the envelope 130, essentially no pressure differential exists between the atmosphere and the interior of the balloon envelope 130 (there is "zero pressure" at the balloon nadir fitting 122), thus no appreciable amounts of air or gas should flow in or out.

Figure 3:
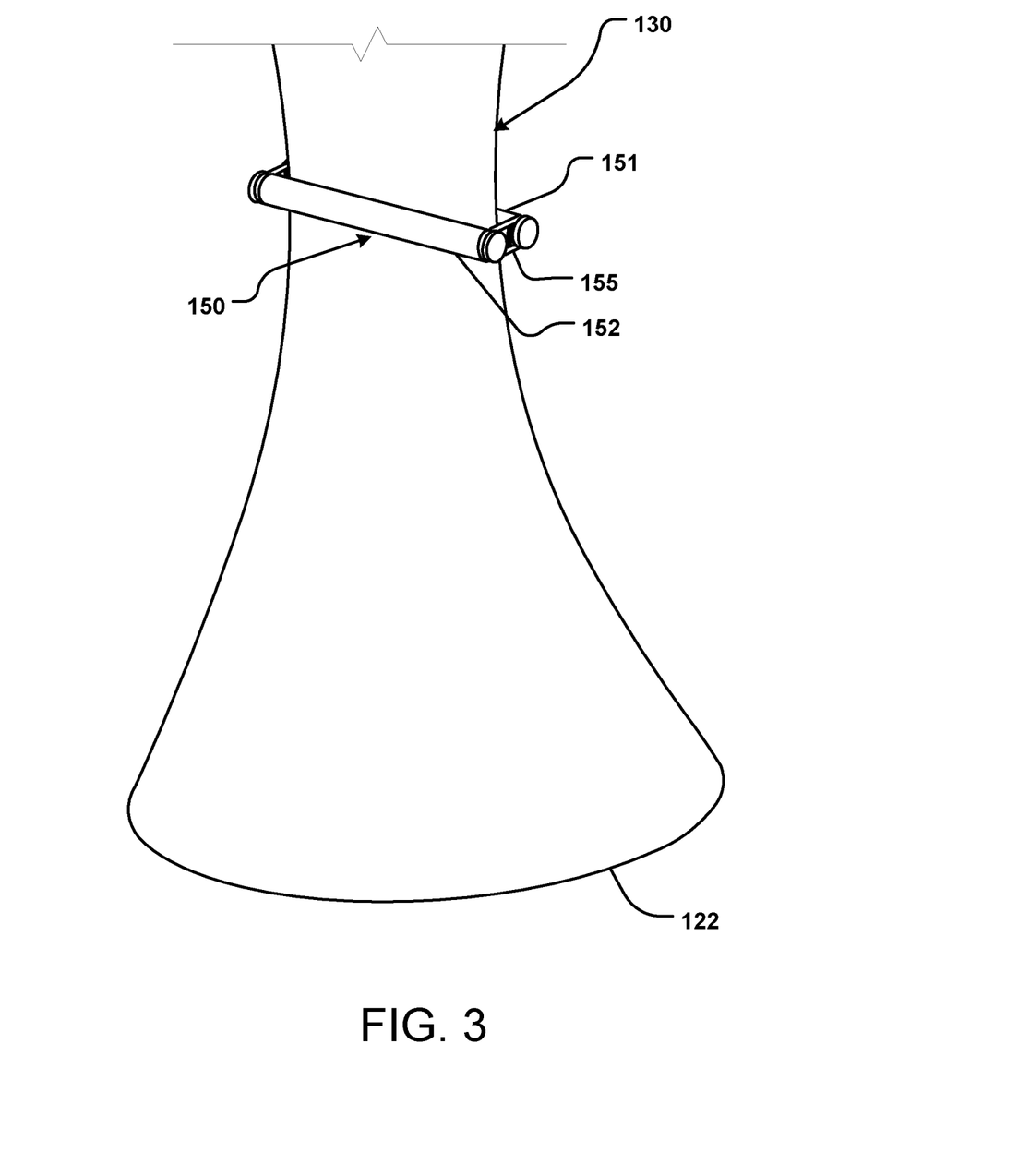
FIG. 3 is a perspective view of an ingestion clip suitable for use in a balloon system.
Figure 4:
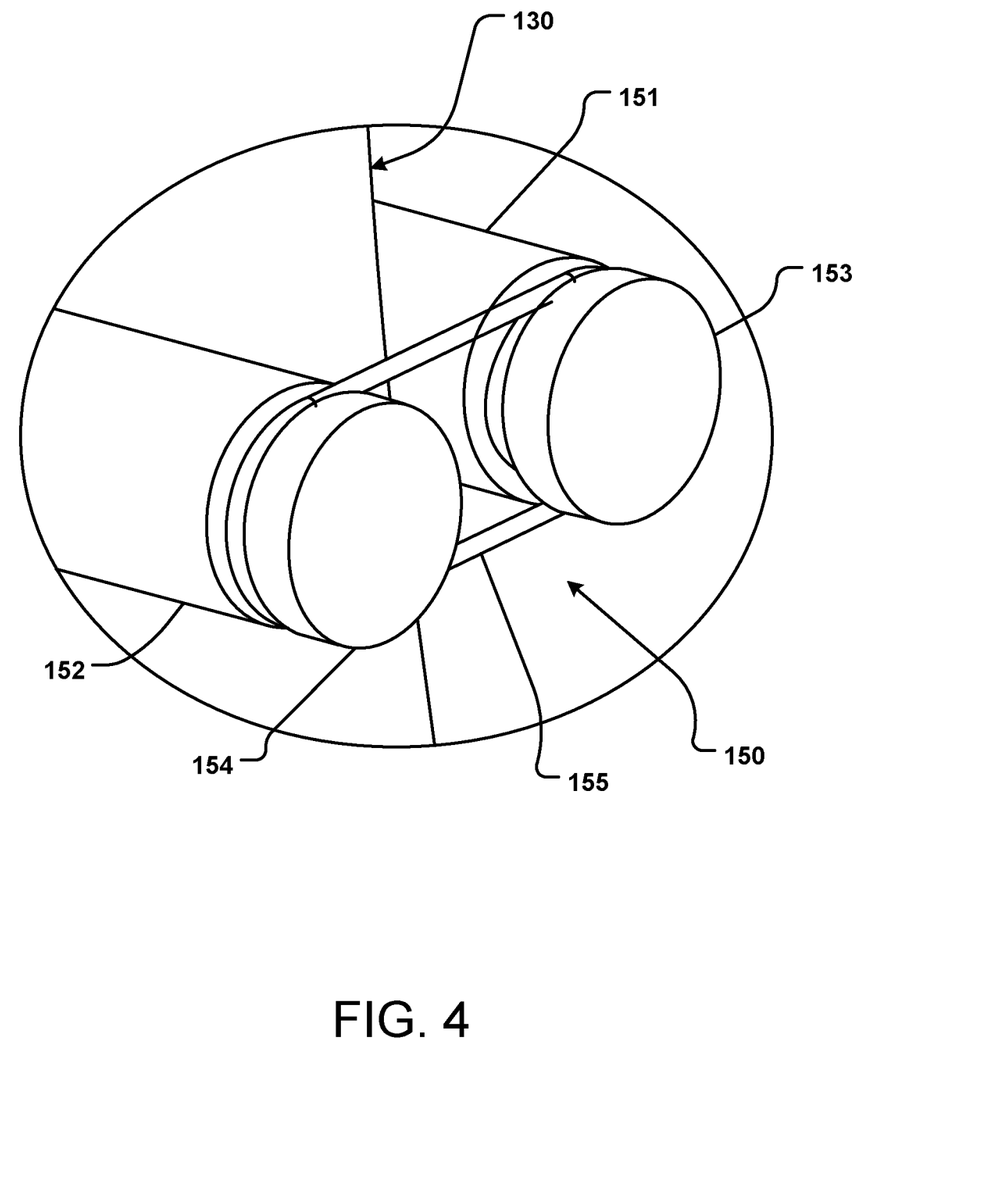
FIG. 4 is an enlarged perspective view of a portion of the ingestion clip of FIG. 3.

Turning to FIGS. 3 and 4, a detailed view of the ingestion clip 150 is shown. The ingestion clip 150 has a first element 151 and a second element 152, positioned on and in contact with opposite sides of the balloon envelope 130. Each element 151, 152 is rod-like, elongate, having a first end and a second opposite end, with a first end 153, 154 of each element 151, 152, respectively, seen in FIG. 4. The elements 151, 152 are sufficiently long to extend across the collapsed balloon envelope 130, which may or may not be folded.

The elements 151, 152 are connected together with a fastener 155 having a set breaking strength or set opening strength (i.e., a set force under which the fastener opens). The fastener 155 pulls and secures together the elements 151, 152, applying a pressure against the balloon envelope 130 to inhibit fluid (e.g., air, lift gas) from passing through the portion of the balloon envelope 130 fastened by the clip 150. It could be said that the balloon envelope 130 is clipped by the clip 150.

The fastener 155 has a set breaking strength or set breaking range, rather than merely a minimum breaking strength. The fastener 155 may be, e.g., a cord or rope, a wire, a metal clip, etc. The breaking point or range of the fastener 155 is selected based on the maximum pressure desired in the balloon envelope 130 and thus against the clip 150 before the clip 150 releases; the clip 150 releases based on the desired float altitude of the balloon system 100. The breaking point or range of the fastener 155 may also be selected based on the expected handling loads during manufacturing, transport, general handling and launch so that the clip 150 does not come off prematurely.

When a temporarily sealed balloon envelope 130 (e.g., one having an ingestion clip 150 install thereon) becomes sufficiently full due to expanding gas therein, the envelope 130 creates an outward force on the two elements 151, 152 of the clip 150, applying a load on the fastener 155 until the fastener 155 opens or breaks, releasing the elements 151, 152 so they can fall away from the balloon envelope 130.

By having a fastener 155 on each end of the elements 151, 152, redundancy is created because the fastener 155 at either end could break and release the clip 150.

In the particular embodiment illustrated, the elements 151, 152 are cylindrical wooden dowels held together by a break cord seated in a groove in the dowels to inhibit slippage of the fastener 155 on the dowels. In one implementation, the elements 151, 152 are made of a lightweight, fully biodegradable material such as a lightweight wood (e.g., balsa wood), such that they may be shed freely without posing a falling object hazard or an environmental concern. Other examples of suitable elements include oval dowels, flat elongate plates, or any rod-like elements having any cross-section, either wooden, plastic, metal, or other material. The elements 151, 152 should be sufficiently rigid to withstand bending under the pressure of the expanding balloon envelope 130.

The elements 151, 152 could be similar, substantially the same, or different in geometry and/or material.

In an alternate embodiment, the ingestion clip may be formed from a single element and a breakable fastener. For example, the single element may be a U-shaped or a hinged clip having the breakable fastener at the open end.

The elements 151, 152, or any variation of the ingestion clip 150, can be attached to the balloon system 100 (e.g., to the balloon envelope 130) so that they do not drop when opened, but rather, remain connected to the envelope 130.

To install the ingestion clip 150, the elements 151, 152 are placed on opposite sides of the balloon envelope 130 near the nadir fitting 122 and secured with the fastener 155. In one implementation, the nadir fitting 122 is rigid so that the elements 151, 152 cannot be forced down the balloon past a certain point because of the nadir fitting 122. The elements 151, 152 can be placed close enough to the nadir fitting 122 that the elements 151, 152 would be forced open instead of sliding down the balloon when a pressure in the balloon envelope 130 is experienced. This exact location may be different for balloon envelopes 130 of different geometries. In some embodiments, the ingestion clip 150 is positioned a distance from the nadir fitting 122 that is 1× to 4× the diameter of the nadir fitting 122, in some embodiments, the distance is 1× to 2× the diameter, and in other embodiments the distance from the nadir fitting 122 is 1.5× the diameter of the nadir fitting 122. The fastener 155 should hold the elements 151, 152 sufficiently tight to inhibit movement (e.g., sliding) of the elements 151, 152 on the balloon envelope 130.

Figure 5:
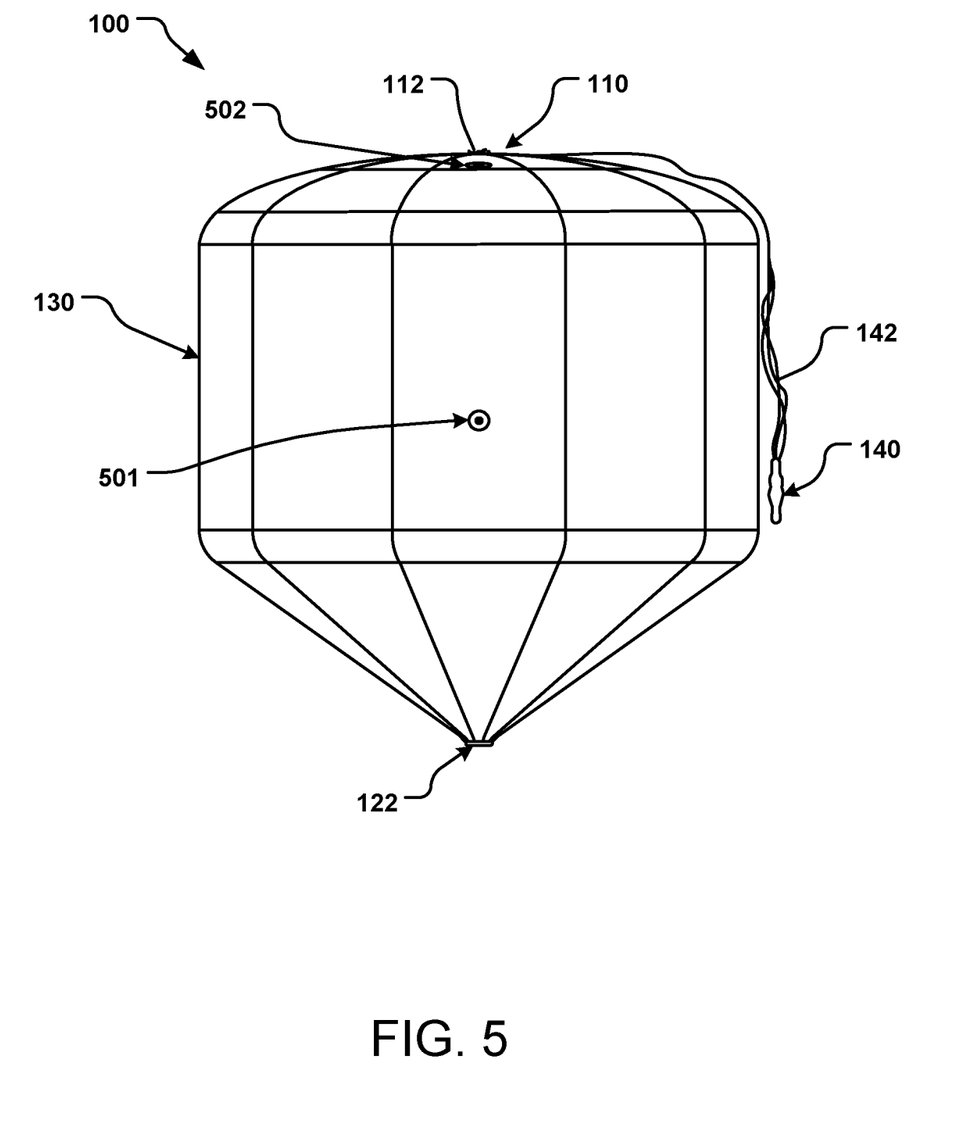
FIG. 5 is a perspective view of the example balloon system in a third configuration.

FIG. 5 shows the balloon system 100 with the balloon envelope 130 substantially fully expanded and in a float configuration, as it may be when hovering at a substantially stable altitude after ascending. At this fullness, the nadir fitting 122 may remain open to allow for continuous venting of the lift gas from the balloon envelope 130, which may be desired as the gas is heated and expanded further due to solar energy.

In this view of FIG. 5, a fill port 501 used during the launch process to fill the balloon envelope 130 is visible.

At this state, the parachute 140 is hanging freely inverted next to the balloon envelope 130 so that if the system were to fail unexpectedly and/or begin to descend, the parachute 140 would be available and ready to inflate. Attaching the parachute 140 at the top end 110 of the balloon envelope 130 could allow the parachute 140 to be out of a container and ready to inflate without interfering with the operation of a payload or entangling with equipment that resides below the balloon envelope 130. The parachute 140 may be connected to the first end 110 of the balloon envelope 130 via the cords or lines 142. The top or first end 110 of the balloon has the apex fitting 112 that could be released to intentionally cause the balloon to vent out the top and start to descend. The balloon system 100 could also include a secondary termination mechanism 502, that could be used to release the lift gas of the balloon envelope 130 through a smaller opening than that formed by releasing the apex fitting 112. For example, the secondary termination mechanism 502 could be initiated by the payload 1000, e.g., via a short range radio signal if the apex termination system using the apex fitting 112 were to fail. Both termination systems allow the balloon envelope 130 to vent from the top, keeping the orientation of the balloon system 100 the same as it transitions from ascent to descent.

The particular balloon envelope 130 of FIG. 5 has a unique shape that is substantially conical at the base or second end 102 proximate the nadir fitting 122, substantially cylindrical in its midsection and hemispherical at its top or first end 101.

Figure 6A:
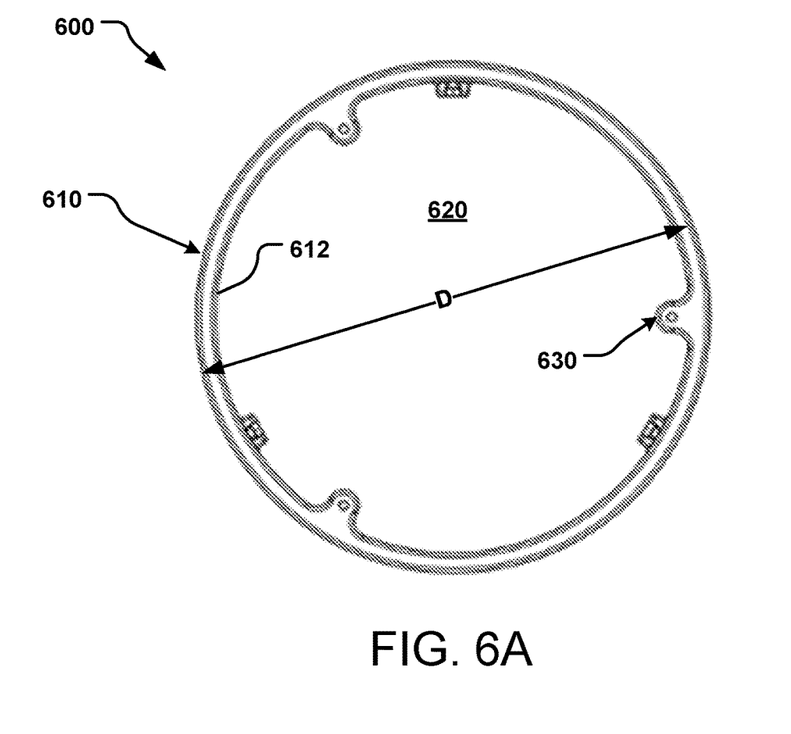
FIG. 6A is a top plan view of an example nadir fitting.
Figure 6B:
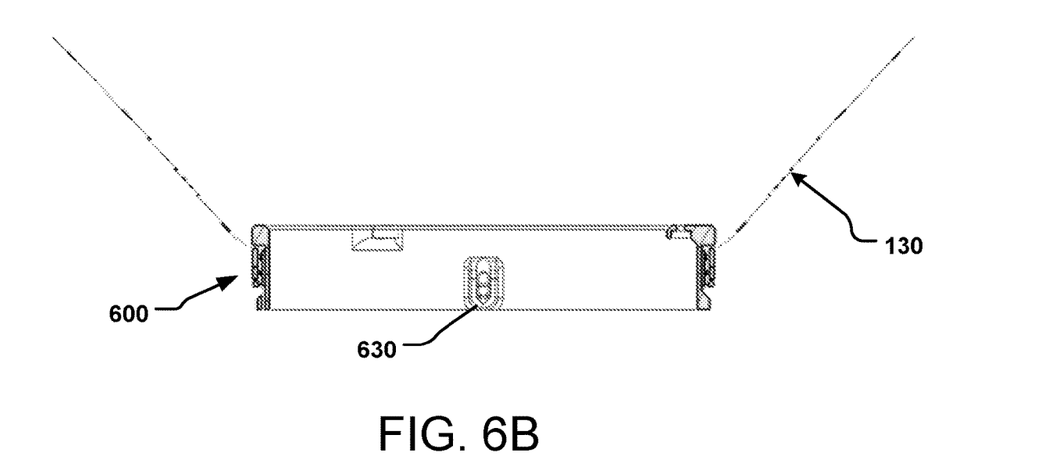
FIG. 6B is a side view of the nadir fitting engaged with a balloon envelope.
Figure 7:
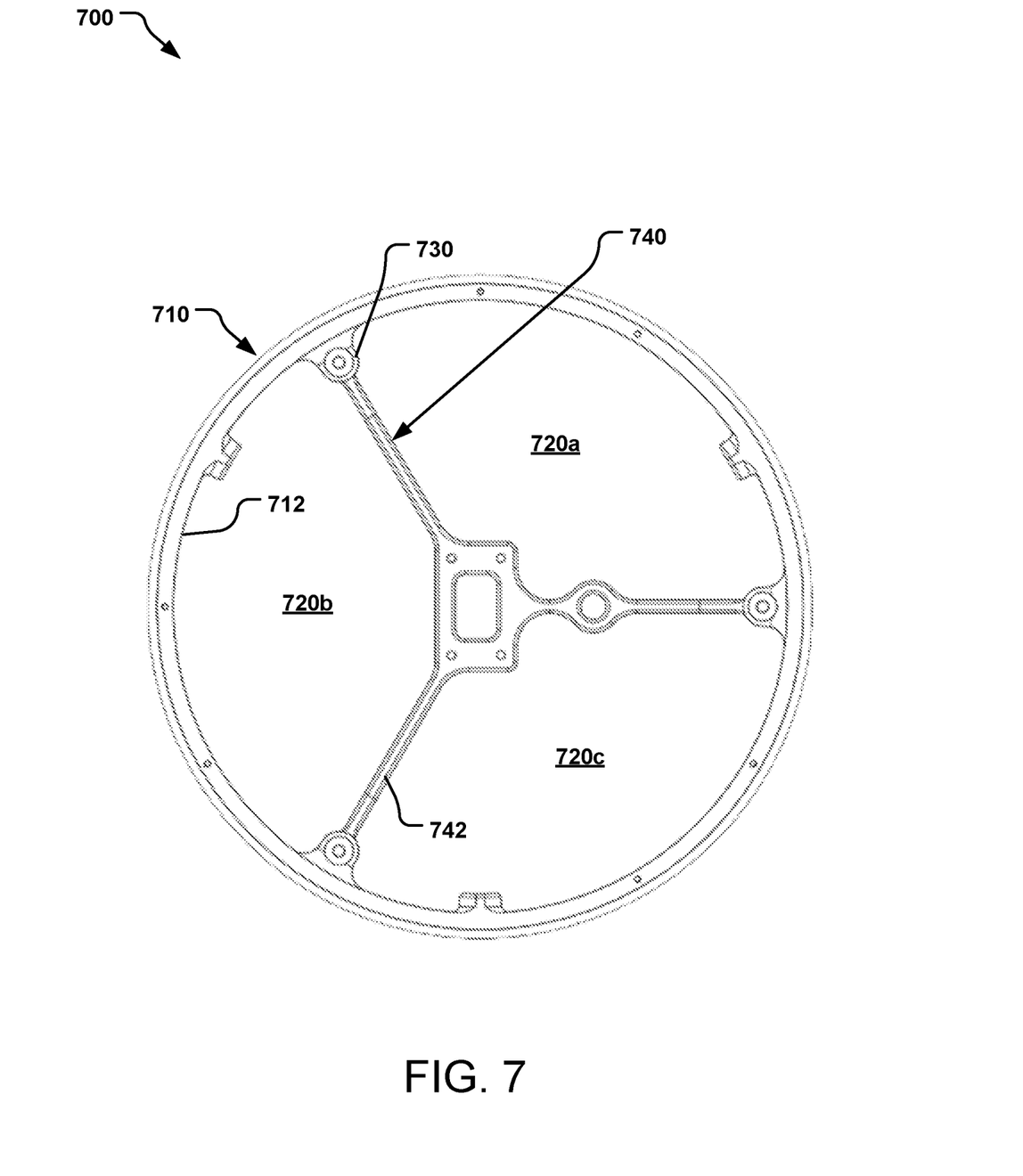
FIG. 7 is a top plan view of another example nadir fitting.

FIGS. 6A and 6B and FIG. 7 show examples of nadir fittings having a substantially or fully unobstructed aperture therein, which, when installed at the base or second end 102 of the balloon envelope 130, create a substantially unobstructed path from the interior of the balloon envelope 130 to the outside.

FIGS. 6A and 6B show a first example of a nadir fitting 600 having a circular shape; other suitable shapes include oval, elliptical, square, rectangular, triangular, pentagonal, hexagonal, octagonal, optionally with any sharp corners rounded. The nadir fitting 600 has a frame 610 that forms the overall shape of the fitting 600, the frame 610 having an inner edge 612 that defines at least one aperture 620 through the fitting 600. The aperture 620 provides an unobstructed path for air through the fitting 600. Positioned on the frame 610, and in this embodiment, extending from the inner edge 612 into the aperture 620, is at least one payload mount 630. The nadir fitting 600 has a diameter D defined by the frame 610.

In FIG. 6B, the nadir fitting 600 is shown engaged with the balloon envelope 130.

FIG. 7 shows a second example of a nadir fitting 700 having a circular shape defined by a frame 710 that forms the overall shape of the fitting 700, the frame 710 having an inner edge 712 with payload mounts 730. The fitting 700 includes a removal frame 740, having spokes 742 extending radially across the frame 710, the spokes 742 forming three apertures 720a, 720b, 720c. Even with the frame 740, the apertures 720 provides a substantially unobstructed path for air through the fitting 700.

FIGS. 8 through 11 show a parachute system that can be used in a balloon system such as the system 100, variations thereof, or other balloon systems having an exposed parachute attached to the top end of the balloon envelope.

Figure 8:
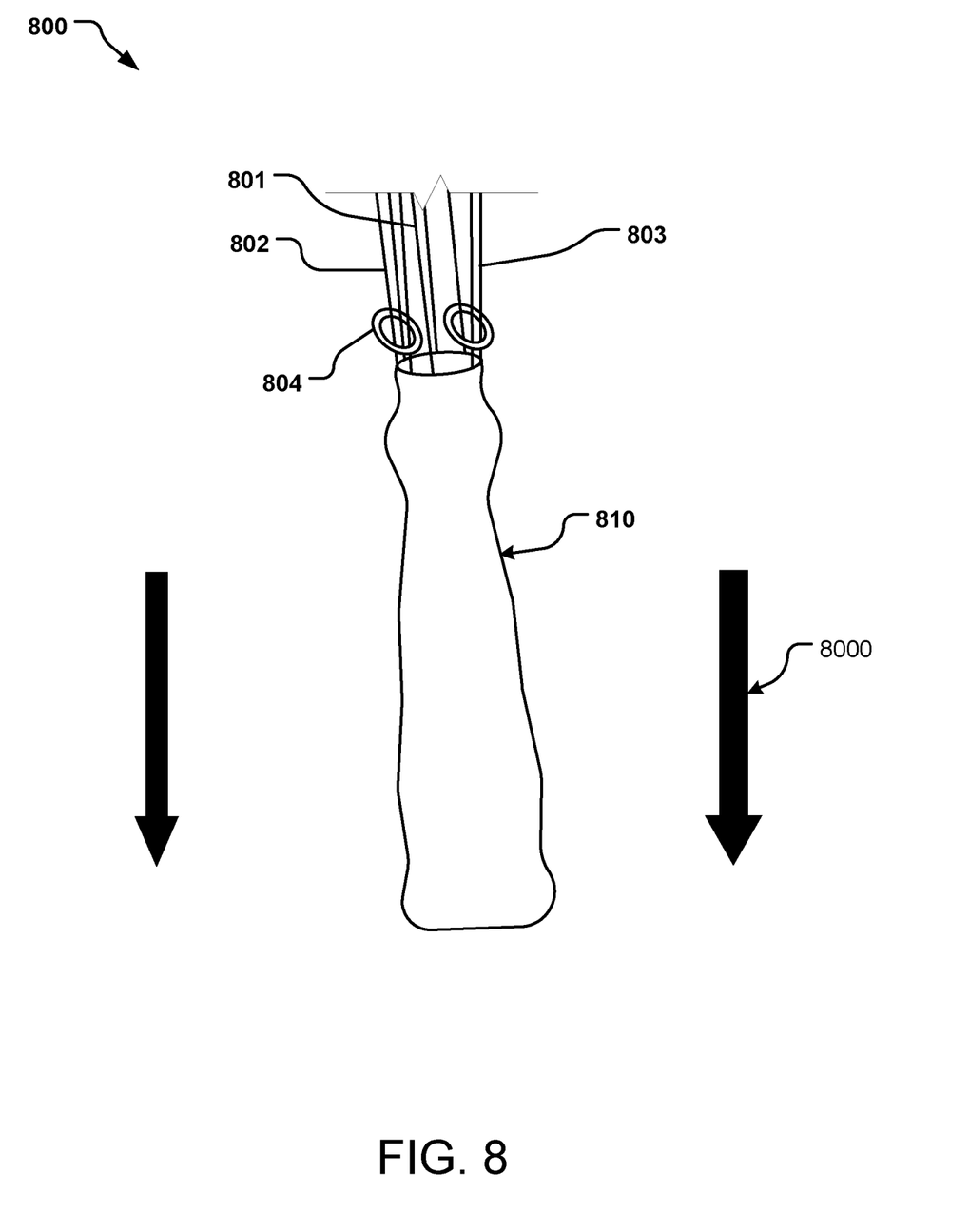
FIG. 8 is a schematic view of an example parachute system in a first orientation.

FIG. 8 shows a parachute system 800 that is inverted, as it would be hanging from the top of a balloon while the balloon is ascending or at float. The parachute system 800 has a parachute 810, a plurality of line groups 801, 802, 803, and an inflation lock 804 for at least one of the line groups 801, 802, 803; in FIG. 8, line groups 802, 803 are shown each with an inflation lock 804 and line group 801 is without a lock. Each line group 801, 802, 803 has at least two lines attached to the parachute 810. The number of line groups, and the number of lines in each group, can vary. For example, the line group 801 going to the center of the parachute 140 may only be present for certain types of parachutes, such as toroidal parachutes or parachutes with a pulled-down apex.

Because balloons ascend at substantial rates in most cases, a relative downward wind 8000 is present as the balloon ascends. Because of this downward wind 8000, a parachute hanging upside down, as in FIG. 8, may cause the parachute to inflate while the system ascends. If a parachute inflates during ascent, it may cause unwanted drag that could slow the system, including flailing around in an unwanted way that could lead to entanglement. To stop an inverted parachute from inflating, the parachute system 800 of FIG. 8 includes the one or more inverted inflation locks 804 on the lines.

Each inverted inflation lock 804 captures and restrains together a group of parachute lines, e.g., line groups 802, 803, with the locks 804 moveable (e.g., slidable) along a length of the lines. In some cases, such as that of FIGS. 8 through 11, not all of the parachute lines or line groups are captured within the inflation locks 804; as indicated above, the center line group 801 is not engaged with a lock 804.

In this ascent position of FIG. 8, the locks 804 are proximate the parachute 810. The inverted inflation locks 804 are sufficiently heavy to remain proximate the parachute 810 and keep the parachute 810 in the inverted position during balloon launch yet still light enough to permit inversion of the parachute 810 when the balloon system to which the parachute system 800 is attached begins to fall from the sky.

Figure 9:
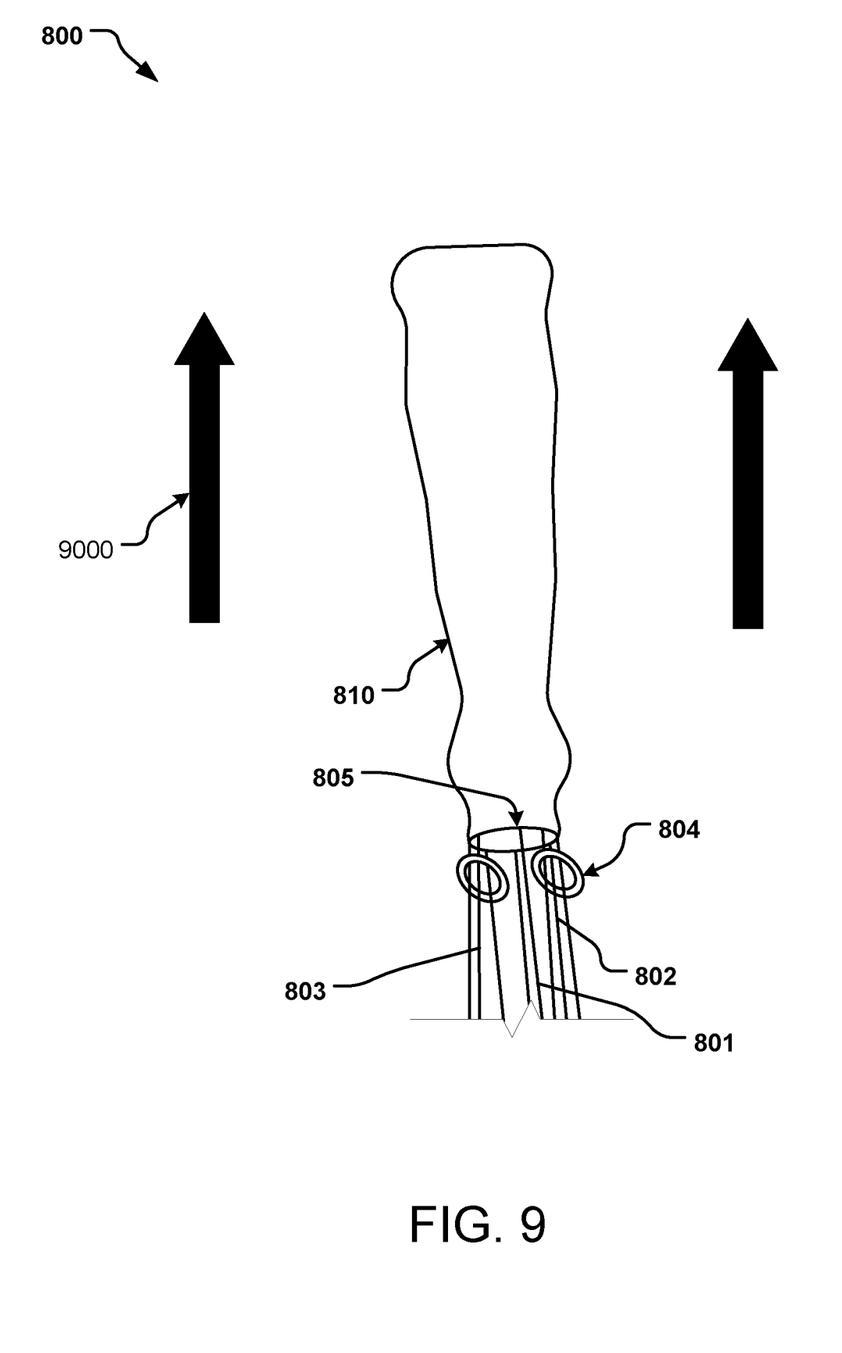
FIG. 9 is a schematic view of the parachute system of FIG. 8 in a second orientation.

When a parachute 810 is inverted, as in FIG. 8 during a balloon launch or ascent, the inverted inflation locks 804 are held on the line groups 802, 803 against the parachute 810 by their own weight, restricting the lines in the line group from spreading apart, and therefor restricting the parachute 810 from inflating. The weight of the inflation lock 804 can be designed to be sufficiently heavy to restrict inflation when the parachute 810 is inverted as in FIG. 8, but not so heavy that the device weighs down the parachute 810 so that it is not able to turn right-side-up when the balloon system begins to descend. FIG. 9 shows the parachute system 800 early on in a descent, now with a relative upward wind 9000 that a parachute would typically experience.

FIG. 9 shows the parachute 810 with the inverted inflation locks 804 in a descent state, immediately after the parachute 810 has righted itself. When a system starts to descend, a relative upward wind 9000 may form in the opposite direction of the downward wind 8000, which may exist during the ascent. This upward wind 9000 facilitates flipping the parachute over so that the parachute 810 is above the line groups 801, 802, 803. When in this configuration, the weight of the inverted parachute inflation locks 804 pushes the locks 804 down their respective lines, while air may additionally be starting to enter the parachute as the relative winds increase during descent, which allows the individual lines of the line groups to separate and the parachute 810 to start to open up.

Figure 10:
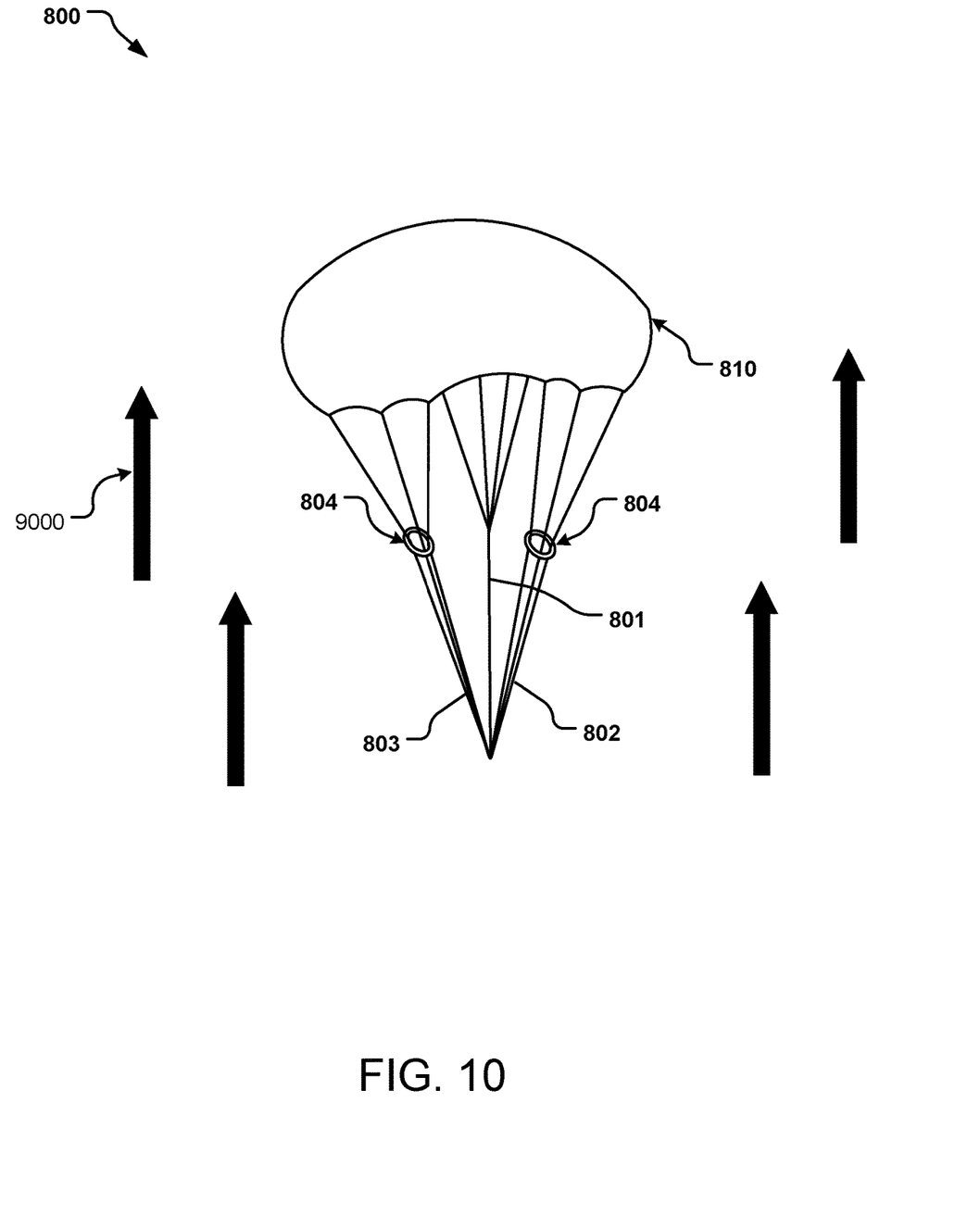
FIG. 10 is a schematic view of the parachute system of FIG. 8 and FIG. 9 in a partially open configuration.

FIG. 10 shows the parachute 810 in a descent state where the parachute 810 is starting to open and the inverted inflation locks 804 are sliding down their respective line groups 802, 803. As seen in FIG. 10, the locks 804 are no longer proximate the parachute 810, but have progressed away from the parachute 810 along the lines. Once the parachute 810 starts to open, the locks 804 experience an additional force pushing them further down the lines of the expanding parachute 810 as the parachute 810 spreads out and opens.

The locks 804 can be arranged in any of various manners, depending on the type of parachute. For example, one inverted inflation lock could be positioned to encompass all lines. For a parafoil-type parachute, one or more inverted inflation locks could be used on different quadrants of the parachute, e.g., four inverted inflation locks, one capturing the lines that go to the front right, front left, back right and back left quadrants of the parachute. For a toroidal-type parachute, such as the parachute 810 of FIGS. 8 through 11, the locks 804 could be used on the line groups 802, 803 that go to the skirt of the parachute 810, and the center line group 801 could be left out of the inverted inflation locks.

Figure 11:
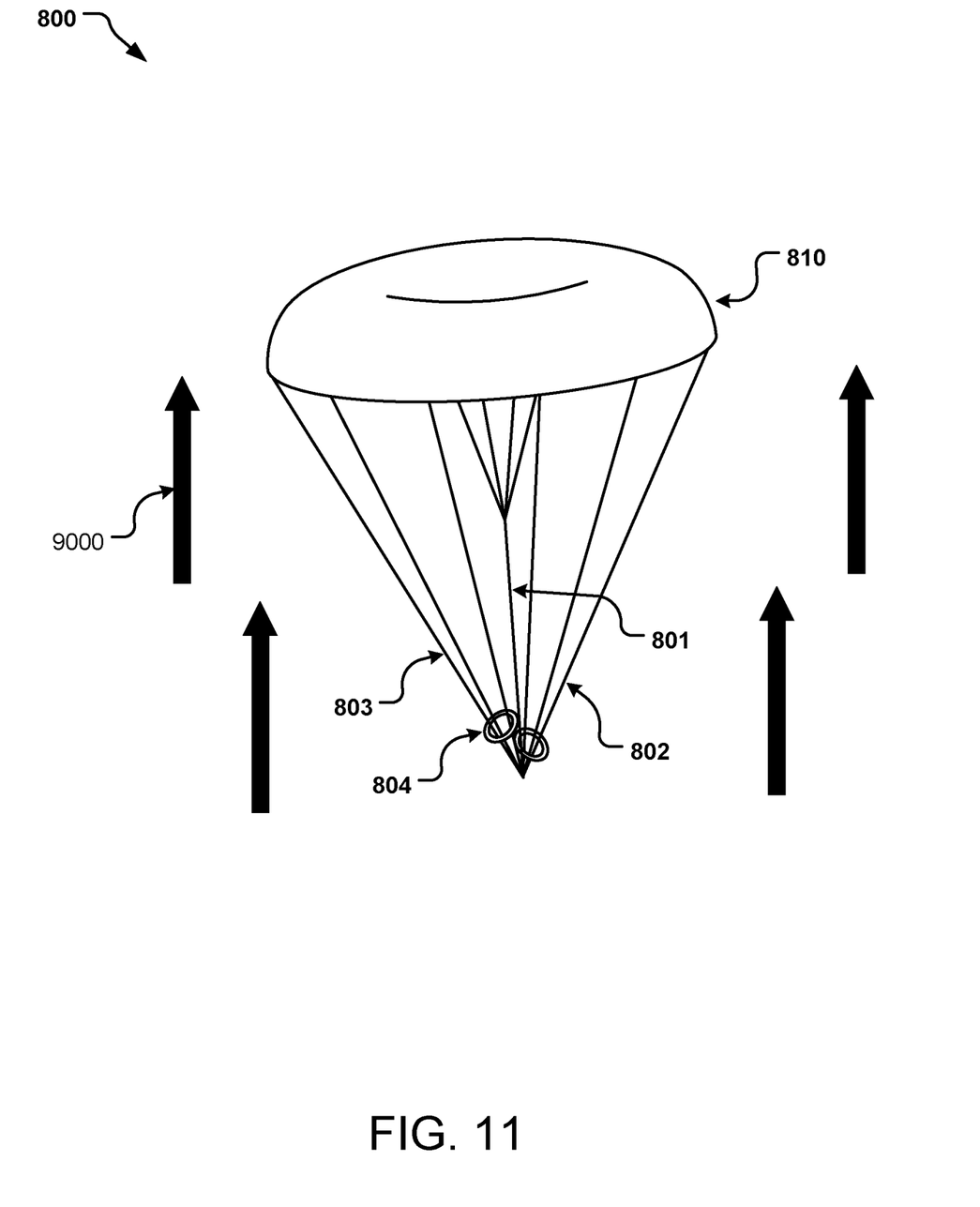
FIG. 11 is a schematic view of the parachute system of FIG. 8 and FIG. 9 in a fully open configuration.

FIG. 11 shows the parachute system 800 with the parachute 810 in a fully inflated state while descending, with the relative upward wind 9000 shown. At this state, where the parachute 810 is fully open with the skirt fully spread out and the line groups 801, 802, 803 fully pulled apart, the inflation locks 804 have moved (e.g., slid) to a position distal from the parachute 810.

In this state, the locks 804 are held down by both the force of gravity and by the spreading force of the lines in the line groups 802, 803. The wind 9000 created by the descending system maintains the parachute 810 correctly oriented as the system makes its way to the ground.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Various features and details have been provided in the multiple designs described above. It is to be understood that any features or details of one design may be utilized for any other design, unless contrary to the construction or configuration. Any variations may be made. For example, a balloon system may have the inflation locks without having an ingestion clip. Alternately, a balloon system may have an ingestion clip without utilizing the inverted inflation locks.

The above specification and examples provide a complete description of the structure and use of exemplary embodiments of the invention. The above description provides specific embodiments. It is to be understood that other embodiments are contemplated and may be made without departing from the scope or spirit of the present disclosure. The above detailed description, therefore, is not to be taken in a limiting sense. For example, elements or features of one example, embodiment or implementation may be applied to any other example, embodiment or implementation described herein to the extent such contents do not conflict. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed is:

1. A balloon system comprising:
a balloon envelope having an interior, a first end and a second end having a nadir fitting; and
an ingestion clip positioned on an exterior of the balloon envelope between the first end and the second end and sealing access to the interior, the ingestion clip having at least one element secured against the exterior of the balloon envelope with a fastener with a set breaking strength adapted to break when a balloon pressure within the interior reaches a predefined set pressure,
wherein when in use, after the fastener breaks, the balloon floats at a float altitude.

2. The balloon system of claim 1, wherein the nadir fitting is a substantially circular, rigid element having an aperture therethrough.

3. The balloon system of claim 1, wherein the fastener is a break cord having the set breaking strength.

4. The balloon system of claim 1, wherein the nadir fitting has a diameter, and the ingestion clip is positioned a distance 1× to 4× of the diameter from the second end of the balloon envelope.

5. The balloon system of claim 1, wherein at least a portion of the ingestion clip is connected to the balloon envelope.

6. The balloon system of claim 1, wherein the at least one element comprises two rod-like elements, each rod-like element having a first end and an opposite second end.

7. The balloon system of claim 6, wherein the ingestion clip comprises two rod-like elements, each rod-like element having a first end and an opposite second end, hinged at the first ends or the second ends.

8. The balloon system of claim 6, wherein the two rod-like elements are wooden dowels.

9. The balloon system of claim 8 comprising two wooden dowels with break cord at each of the ends of the dowels.

10. A zero pressure balloon system comprising:
a balloon envelope having an interior, a first end and a second end having a nadir fitting; and
an ingestion clip with a fastener adapted to break to release an amount of lift gas from the balloon envelope through the nadir fitting in response to obtaining a predefined set pressure within the balloon envelope,
wherein when in use, the balloon envelope floats at a float altitude after the fastener breaks.

11. The balloon system of claim 10, wherein the nadir fitting has a diameter, and the ingestion clip is positioned a distance 1× to 4× of the diameter from the nadir fitting.

12. The balloon system of claim 10, wherein the ingestion clip comprises two rod-like elements, each rod-like element having a first end and an opposite second end, and the fastener is a break cord having a set breaking strength.

13. The balloon system of claim 12, wherein the rod-like elements are wooden dowels.

14. The balloon system of claim 12 comprising break cord at each of the ends of the dowels.

15. A method of using a zero pressure balloon system, the balloon system having a balloon envelope and an ingestion clip removably connected thereto, the method comprising:
providing sufficient lift gas to the balloon envelope to initiate ascent of the balloon system to a float elevation;
wherein:
during ascent of the balloon, the ingestion clip is engaged on the balloon envelope to hold the balloon envelope closed and inhibit air ingestion into the balloon envelope;
in response to obtaining a predetermined set pressure within the balloon envelope during the ascent, a fastener of the ingestion clip breaks and disengages from the balloon envelope to allow lift gas to vent from the balloon envelope;
the ingestion clip does not reengage the balloon envelope during float or descent; and
after disengagement of the ingestion clip, the balloon maintains altitude at the float elevation.

16. The method of claim 15, wherein the fastener is a break cord.

17. The method of claim 15, wherein when the fastener breaks and disengages, the ingestion clip falls away from the balloon envelope.

18. The method of claim 16, wherein the ingestion clip comprises two rod-like dowels held by a break cord.

* * * * *